United States Patent
Song

(10) Patent No.: US 8,156,354 B2
(45) Date of Patent: Apr. 10, 2012

(54) POWER-SAVING SYSTEM AND METHOD FOR COMPUTER

(75) Inventor: Yong-Jun Song, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1005 days.

(21) Appl. No.: 12/118,682

(22) Filed: May 10, 2008

(65) Prior Publication Data

US 2009/0183015 A1   Jul. 16, 2009

(30) Foreign Application Priority Data

Jan. 14, 2008   (CN) .......................... 2008 1 0300090

(51) Int. Cl.
   *G06F 1/32* (2006.01)
(52) U.S. Cl. ........................................................ 713/320
(58) Field of Classification Search .................. 713/320
   See application file for complete search history.

(56) References Cited

U.S. PATENT DOCUMENTS

| | | | | |
|---|---|---|---|---|
| 5,412,297 A * | 5/1995 | Clark et al. | .................... | 318/468 |
| 5,886,632 A * | 3/1999 | Shpater | ......................... | 340/541 |
| 6,545,612 B1 * | 4/2003 | Lindgren et al. | ........... | 340/686.6 |
| 7,010,710 B2 * | 3/2006 | Piazza | ........................... | 713/323 |

\* cited by examiner

*Primary Examiner* — Kim Huynh
*Assistant Examiner* — Eric Chang
(74) *Attorney, Agent, or Firm* — Altis Law Group, Inc

(57) ABSTRACT

An exemplary power-saving system for a computer includes a sensor connected between a standby power pin and ground, an amplifier, two resistors connected in series between the standby power pin and ground, a comparator, an electronic switch, and an MPU. The amplifier has two amplifier input terminals respectively connected to an output of the sensor and ground, and an amplifier output terminal grounded via an integrator. The comparator has two comparator input terminals respectively connected to the integrator and a node between the two resistors, and a comparator output terminal connected to a first terminal of the electronic switch. A first pin of the MPU is connected to a second terminal of the electronic switch, and connected to the standby power pin via a third resistor. The MPU has second and third pins connected to a system power pin and the BIOS of the computer respectively.

8 Claims, 2 Drawing Sheets

POWER-SAVING SYSTEM AND METHOD FOR COMPUTER

BACKGROUND

1. Field of the Invention

The present invention relates to the field of power saving in electronic devices, and particularly to a power-saving system and method for a computer.

2. Description of Related Art

Computer users often forget to turn off their computers when the computers are not in use, which wastes power.

What is needed is a power-saving system and method for a computer, which automatically turns off the computer when computer users are away from the computer for more than a predetermined time.

SUMMARY

An exemplary power-saving system for a computer includes a sensor connected between a standby power pin and ground, an amplifier, two resistors connected in series between the standby power pin and ground, a comparator, an electronic switch, and an micro processing unit (MPU). The amplifier has two amplifier input terminals respectively connected to an output of the sensor and ground, and an amplifier output terminal grounded via an integrator. The comparator has two comparator input terminals respectively connected to the integrator and a node between the two resistors, and a comparator output terminal connected to a first terminal of the electronic switch. A first pin of the MPU is connected to a second terminal of the electronic switch, and connected to the standby power pin via a third resistor. The MPU has second and third pins connected to a system power pin and the basic input/output system (BIOS) of the computer respectively.

Other novel features and advantages will become more apparent from the following detailed description of preferred and exemplary embodiment when taken in conjunction with the accompanying drawings, in which:

DETAILED DESCRIPTION

Figure 1:
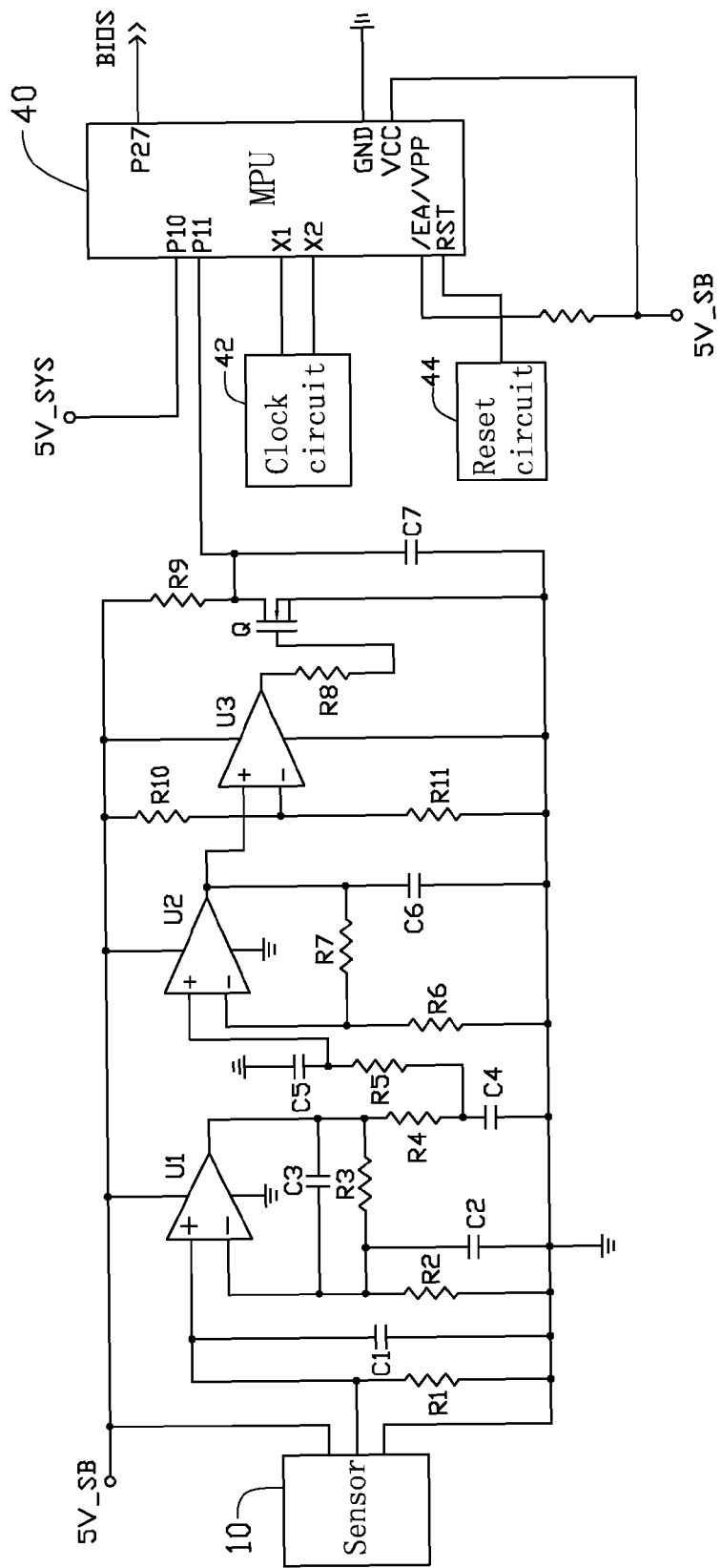
FIG. 1 is a circuit diagram of a power-saving system for a computer in accordance with an exemplary embodiment of the present invention.

Referring to FIG. 1, a power-saving system for a computer in accordance with an exemplary embodiment of the present invention includes a sensor 10, two amplifiers U1, and U2, a comparator U3, an N-channel metallic oxide semiconductor field effect transistor Q functioning as an electronic switch, a MPU 40, a plurality of resistors R1-R11, and a plurality of capacitors C1-C7.

The sensor 10 is mounted on a frame of a computer. The sensor 10 is capable of detecting the presence of a person within a predetermined range. The sensor 10 can be an infrared receiver. The sensor 10 is connected between a 5V standby power pin 5V_SB of the computer and ground, and has an output.

A positive input terminal of the amplifier U1 is connected to the output of the sensor 10, and is grounded via the resistor R1 and the capacitor C1 connected in parallel. The resistor R1 and the capacitor C1 form a filter. A negative terminal of the amplifier U1 is grounded via the resistor R2 and the capacitor C2 connected in parallel. An output terminal of the amplifier U1 is connected to the negative terminal of the amplifier U1 via the resistor R3 and the capacitor C3 connected in parallel. The resistor R4 and the capacitor C4 are connected in series between the output terminal of the amplifier U1 and ground, and the resistor R4 and the capacitor C4 form an integrator. A positive input terminal of the amplifier U2 is grounded via the capacitor C5, and is connected to a node between the resistor R4 and the capacitor C4 via the resistor R5. A negative terminal of the amplifier U2 is grounded via the resistor R6. An output terminal of the amplifier U2 is grounded via the capacitor C6. The resistor R7 is connected between the negative input terminal and the output terminal of the amplifier U2.

The resistors R10 and R11 are connected between the 5V standby power pin 5V_SB and ground in series. The comparator U3 has a positive input terminal connected to the output terminal of the amplifier U2, a negative terminal connected to a node between the resistors R10 and R11, and an output terminal connected to the gate of the transistor Q via the resistor R8. Each of the amplifiers U1 and U2 and the comparator U3 has a power pin connected to the 5V standby power pin 5V_SB, and a ground pin grounded.

The drain of the transistor Q is connected to the 5V standby power pin 5V_SB via the resistor R9, and is grounded via the capacitor C7. The source of the transistor Q is grounded.

In this exemplary embodiment, the type of the MPU 40 is AT89c51 which has clock pins X1 and X2 coupled to a clock circuit 42, a reset pin RST coupled to a reset circuit 44, an external access enable pin /EA/VPP connected to the 5V standby power pin 5V_SB via a resistor, a power pin VCC connected to the 5V standby power pin 5V_SB, a ground pin GND grounded, and three I/O pins P10, P11, and P27. The I/O pin P10 is connected to a 5V system power pin 5V_SYS of the computer. The I/O pin P11 is connected to the drain of the transistor Q. The I/O pin P27 is configured for being connected to the BIOS of the computer.

In this exemplary embodiment, an initial voltage at the I/O pin P11 is low. If no person is detected within a predetermined distance of the computer, that is, the sensor 10 senses no heat and outputs no signal, the 5V standby power pin 5V_SB outputs a high level voltage to the I/O pin P11 via the resistor R9. If a person is detected within the predetermined distance of the computer, the sensor 10 senses heat of the person, and outputs an alternating current (AC) voltage. The AC voltage is filtered by the filter, amplified by the amplifier U1, and transmitted to the integrator to be converted to a direct current (DC) voltage. The DC voltage is amplified by the amplifier U2, and transmitted to the comparator U3. The comparator U3 is calibrated by selecting resistances of the resistors R10 and R11, so that the voltage at the negative input terminal of the comparator U3 is lower than the voltage at the output terminal of the amplifier U2. The comparator U3 outputs a high level signal to turn on the transistor Q, and the voltage at the I/O pin P11 is at a low level when the transistor Q is on.

Figure 2:
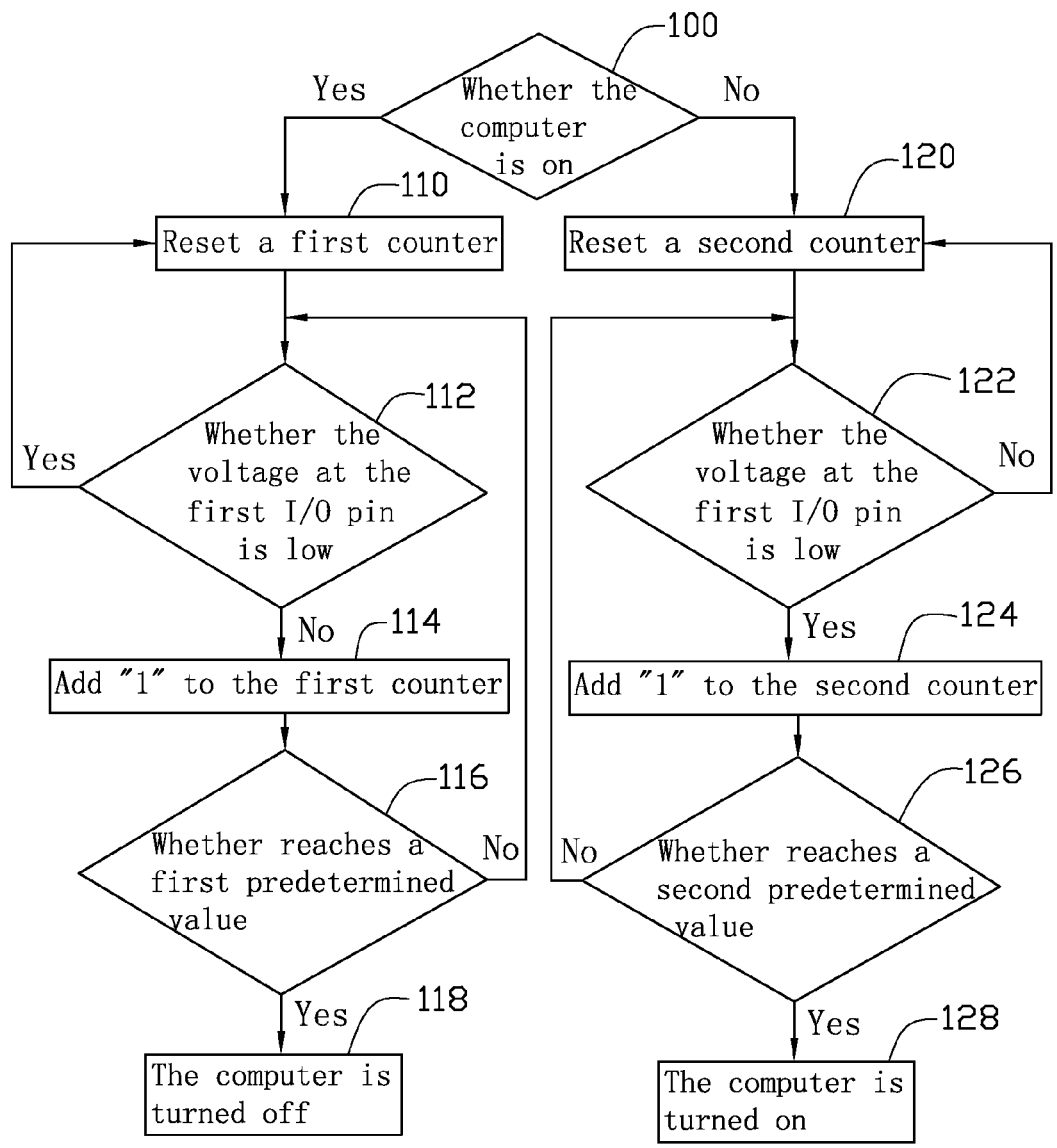
FIG. 2 is a flow chart of a power-saving method used in the system in FIG. 1.

Referring to FIG. 2, the method using the above mentioned system to save power for the computer includes the following steps (note: steps are numbered in reference to FIG. 2 and are not necessarily ordered in numerical order):

Step 100: the MPU 40 detects whether the computer is on according to the voltage at the I/O pin P10, if the voltage at the I/O pin P10 is at a high level, the computer is on, and step 110 is executed; if the voltage at the I/O pin P10 is at a low level, the computer is not on, and step 120 is executed.

Step 110: a first counter of the MPU 40 is set to zero.

Step 112: the MPU 40 determines whether a person is within the predetermined distance of the computer according to the voltage at the I/O pin P11. If the voltage at the I/O pin P11 is at a low level, a person is within the predetermined distance of the computer, and the process returns to step 110, to set the first counter to zero. If the voltage at the I/O pin P11 is at a high level a person is not within the predetermined distance and the process proceeds to step 114.

Step 114: the first counter is incremented by one.

Step 116: the MPU 40 detects whether the count on the first counter is equal to a predetermined value, which corresponds to an amount of time no person has been detected within the predetermined distance of the computer. If the count is not equal to the predetermined value, then the process returns to step 112, to determine whether a person is within the predetermined distance; if it is equal to the predetermined value, the process proceeds to step 118, to turn off the computer.

Step 118: the I/O pin P27 sends a high level control signal to the BIOS of the computer, to turn off the computer.

Step 120: a second counter of the MPU 40 is set to zero.

Step 122: the MPU 40 detects whether the voltage at the I/O pin P11 is at a low level. If the voltage at the I/O pin P11 is at a low level, a person has been detected to be within the predetermined distance of the computer, and step 124 is executed; if the voltage at the I/O pin P11 is at a high level, the process returns to step 120, to set the second counter to zero.

Step 124: increment the second counter by one.

Step 126: the MPU 40 detects whether the count of the second counter is equal to a second predetermined value which corresponds to an amount of time the person detected in step 122 has been within the predetermined distance of the computer. If the count is not equal to the second predetermined value, return to the step 122, to detect the voltage level at the I/O pin P11; if it is equal to the second predetermined value, then go to step 128, to turn on the computer.

Step 128: the I/O pin P27 sends a low level control signal to the BIOS of the computer, to turn on the computer.

The power saving system and method can save power used by the computer by turning off the computer automatically when the user is away more than a predetermined time, and also the system and method conveniently restores power and starts the computer automatically when the user returns. This invention can be used with other electrical devices and can employ other remote sensors.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A power-saving system for a computer, the system comprising:

a sensor connected between a standby power pin of the computer and ground, the sensor comprising an sensor output;

a first amplifier comprising a first amplifier positive input terminal connected to the sensor output, a first amplifier negative input terminal that is grounded, and a first amplifier output terminal that is grounded via an integrator;

first and second resistors connected in series between the standby power pin and ground;

a comparator comprising a comparator positive input terminal connected to the integrator, a comparator negative input terminal connected to a node between the first and second resistors, and a comparator output terminal;

an electronic switch comprising a first terminal, connected to the comparator output terminal, a second terminal, and a third terminal that is grounded;

a micro processing unit comprising a first I/O pin connected to the second terminal of the electronic switch, a second I/O pin connected to a system power pin of the computer, and a third I/O pin connected to the basic input/output system of the computer; and a third resistor connected between the first I/O pin of the micro processing unit and the standby power pin;

wherein, when the sensor is capable of sensing a person present within a predetermined distance range in front of a monitor, outputting an alternating current signal to the first amplifier positive input terminal: the amplifier is capable of amplifying the alternating current signal; the integrator is capable of converting the amplified alternating current signal to a direct current signal: the comparator is capable of receiving the direct current signal, and outputting a level signal after comparing signals at the comparator positive and negative input terminals, turning on the electronic switch; the first terminal of the electronic switch is capable of outputting a low level signal to the first I/O pin of the micro processing unit, the sensor is also capable of outputting no signal when no person is sensed, turning off the electronic switch, and the first terminal of the electronic switch is capable of outputting a high level signal to the first I/O pin of the micro processing unit.

2. The system as claimed in claim 1, wherein the integrator comprising a fourth resistor and a capacitor which are connected between the first amplifier output terminal and ground in series, and a node between the fourth resistor and the capacitor is connected to the comparator positive input terminal.

3. The system as claimed in claim 1, wherein the electronic switch is an N-channel metallic oxide semiconductor field effect transistor of which the first terminal, the second terminal, and the third terminal are respectively the gate, the drain, and the source.

4. The system as claimed in claim 1, further comprising a second amplifier, a positive input terminal of the second amplifier that is connected to the integrator, a negative input terminal of the second amplifier that is grounded, and an output terminal of the second amplifier is connected to the gate of the N-channel metallic oxide semiconductor field effect transistor.

5. A power-saving method for a computer used in the power-saving system claimed in claim 1, the method comprising:

the micro processing unit detecting whether the computer is on, if the computer is on, a first counter of the micro processing unit is set to zero;

the micro processing unit detecting whether the voltage at the first I/O pin is at a low level, if yes, return to the step of detecting whether the computer is on;

if the voltage at the first I/O pin is at a high level, the first counter is incremented by one;

the micro processing unit detecting whether the count value of the first counter is equal to a first predetermined value; if not, return to the step of detecting the voltage level at the first I/O pin; and if the count of the first counter is equal to the first predetermined value, the micro processing unit sends a first control signal to the basic input/output system of the computer, to turn off the computer.

6. The method as claimed in claim 5, further comprising:

if the computer is off, a second counter of the micro processing unit is set to zero;

the micro processing unit detecting whether the voltage at the first I/O pin is at a low level, if not, return to the step of detecting whether the computer is on;

if the voltage at the first I/O pin is at a low level, the second counter is incremented by one;

the micro processing unit detecting whether the count of the second counter is equal to a second predetermined value, if not, return to the step of detecting the voltage level at a first I/O pin; and if the count of the second counter is equal to the second predetermined value, the micro processing unit sends a second control signal to the basic input/output system of the computer, to turn on the computer.

7. The method as claimed in claim 6, wherein the micro processing unit detects whether the computer is on according to the second pin of the micro processing unit.

8. The method as claimed in claim 6, wherein the first and second control signals are sent by the third pin of the micro processing unit.

* * * * *